Figure 1:
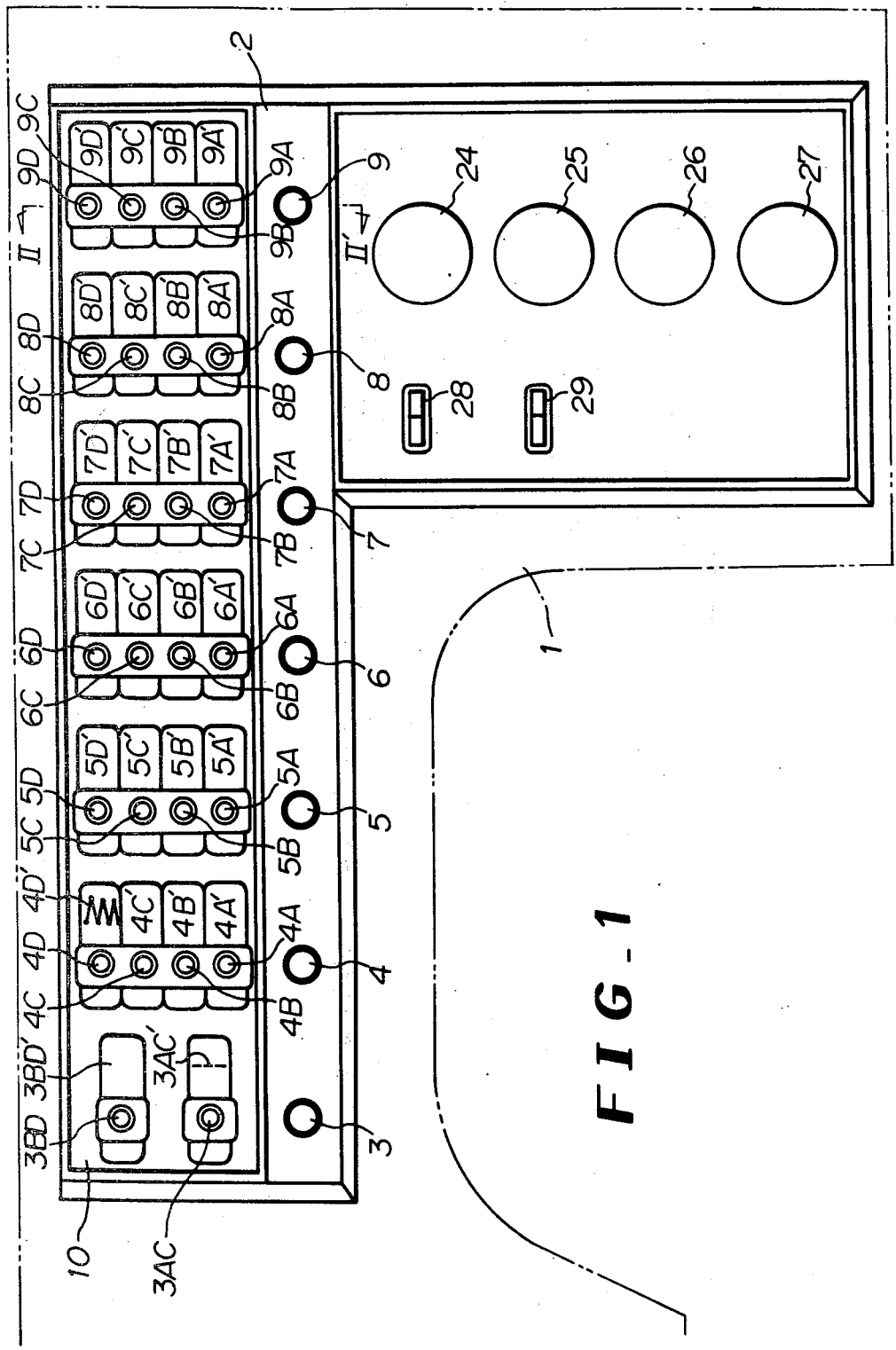

United States Patent [19]

Takenoya et al.

[11] 4,181,086

[45] Jan. 1, 1980

[54] PATTERN SELECTING SYSTEM FOR SEWING MACHINE

[75] Inventors: Hideaki Takenoya; Kazuo Watanabe, both of Hachioji; Toshiaki Kume, Tachikawa; Hachiro Makabe, Fussa; Tamotsu Nakagawa, Hachioji, all of Japan

[73] Assignee: Janome Sewing Machine Co., Ltd., Tokyo, Japan

[21] Appl. No.: 886,911

[22] Filed: Mar. 15, 1978

[30] Foreign Application Priority Data

Mar. 18, 1977 [JP] Japan .................................. 52-29315

[51] Int. Cl.² ............................................... D05B 3/02
[52] U.S. Cl. ............................. 112/158 F; 112/158 E; 112/121.11
[58] Field of Search ........... 112/158 E, 158 F, 121.11, 112/121.12; 340/381

[56] References Cited

U.S. PATENT DOCUMENTS

| 4,005,664 | 2/1977 | Garron ............................ 112/158 E |
| 4,092,938 | 6/1978 | Coughenour et al. ........... 112/158 E |

*Primary Examiner*—Peter P. Nerbun
*Attorney, Agent, or Firm*—Michael J. Striker

[57] ABSTRACT

A rows-and-columns array of indicator lamps, each lamp associated with a selectable stitch pattern, is provided on the machine housing, with one pushbutton switch per column of indicator lamps. In a first embodiment, when a particular column and row contain the single illuminated one of the lamps, depression of the pushbutton switch associated with a different column terminates illumination of the presently lighted lamp and instead effects illumination of the lamp of the same row but in the column associated with the newly depressed pushbutton switch, whereupon repeated pressing of the newly pressed switch causes the illuminated state to shift, lamp by lamp, along such column. Alternatively, when the illuminated-lamp indication is located in a particular row and column, depression of the pushbutton switch associated with a different column causes the illuminated-lamp indication to jump to that column, and in particular always to a predetermined lamp within that column, e.g., the first therein. In this way, when the number of selectable stitch patterns is large, a comparatively small number of pushbutton switches can be utilized to control pattern selection in a way involving a regular and predetermined rule of displacement of the illuminated-lamp indication from column to column.

10 Claims, 5 Drawing Figures

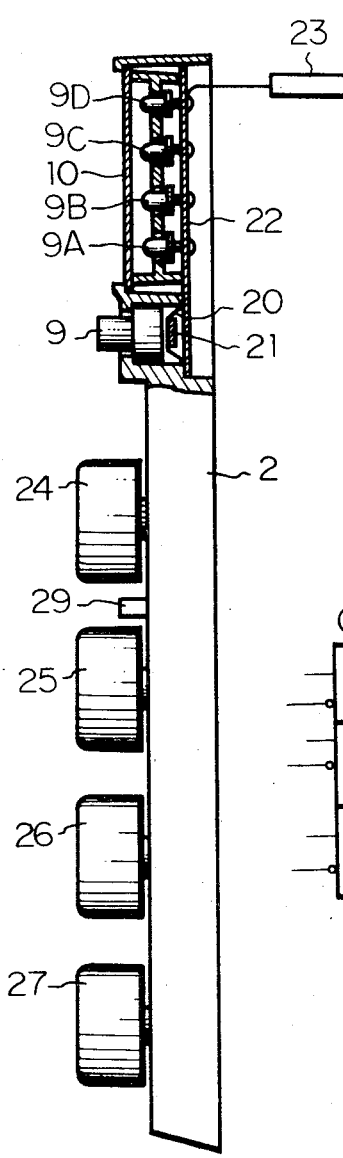
FIG_2
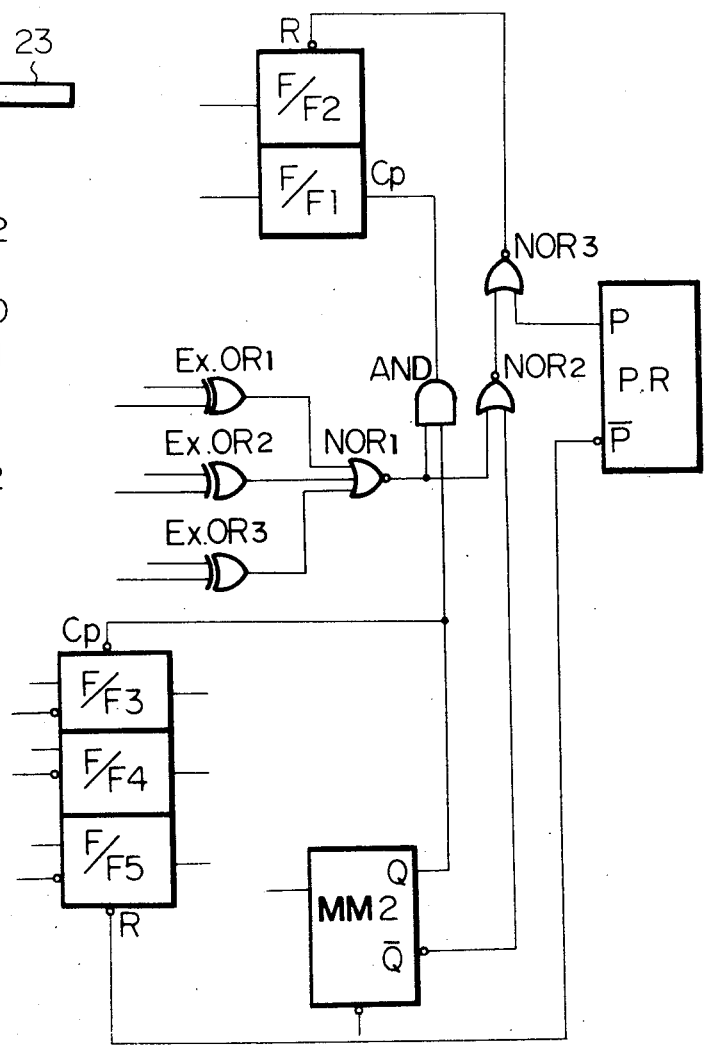
FIG_4

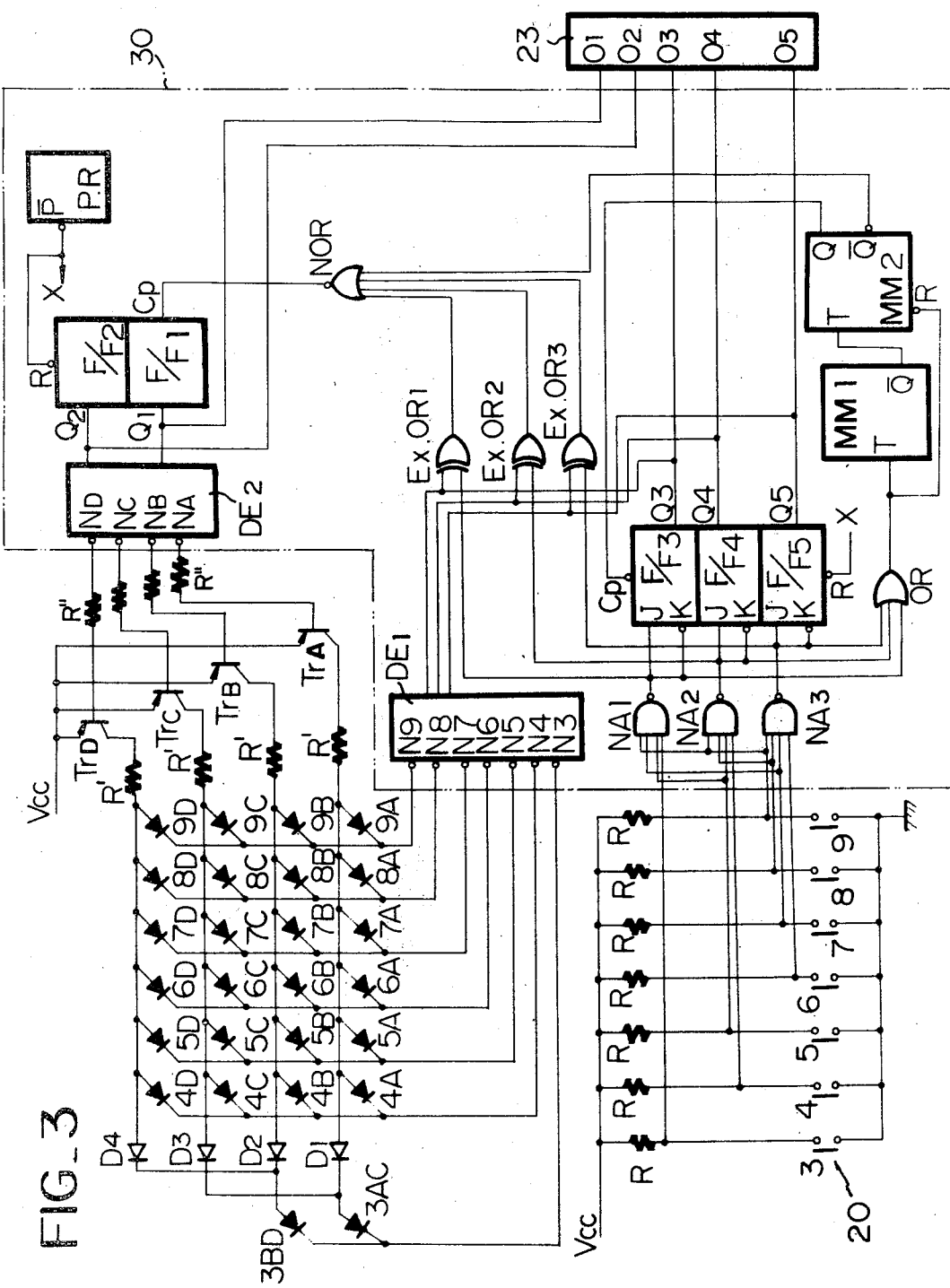
FIG_3

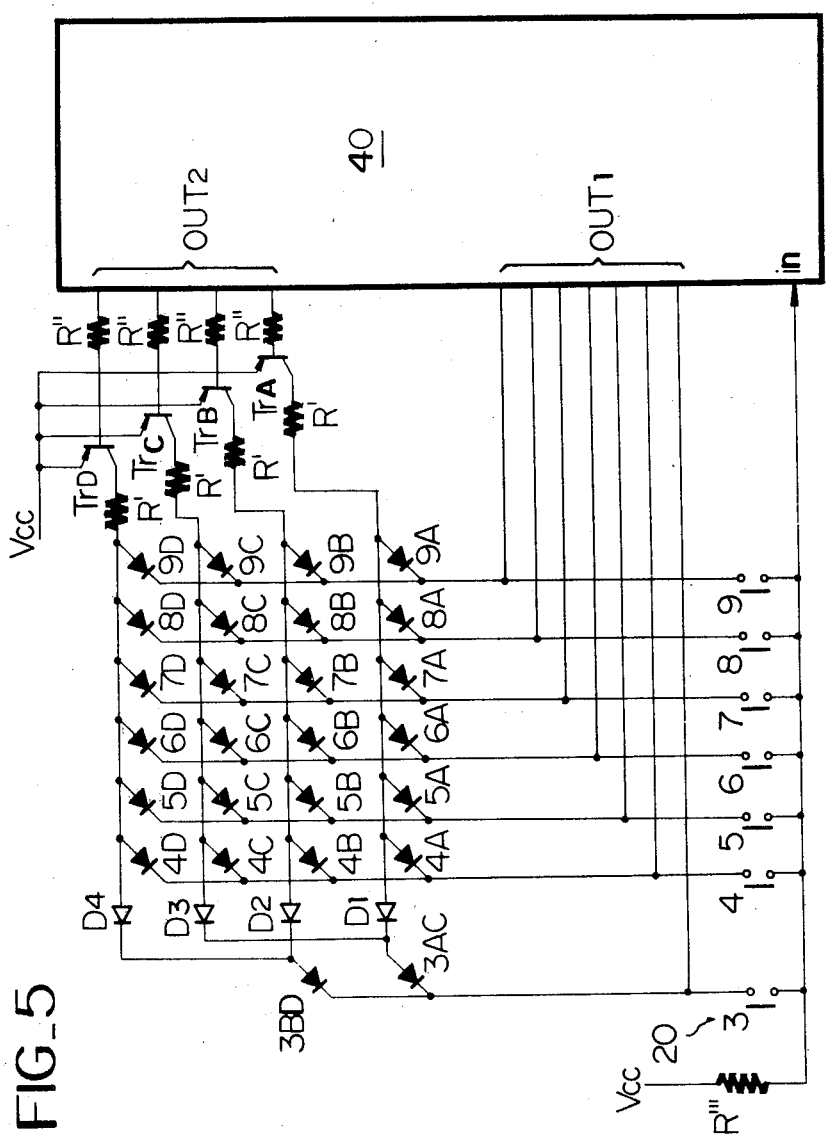
FIG_5

PATTERN SELECTING SYSTEM FOR SEWING MACHINE

BRIEF DESCRIPTION OF THE INVENTION

The invention relates to a pattern selecting system for a sewing machine, which is simple in structure, durable and easy in operation for selecting many possible patterns which a sewing machine could generate. This invention is used in a sewing machine producing patterns by means of pattern forming devices actuated in accordance with the signals from a mechanical or electronic memory storing a plurality of pattern control data.

A conventional mechanical memory, for example a pattern cam device, stores pattern control signals and also drives the pattern forming devices of the sewing machine. It is apparent that such a pattern cam device complicates the machine mechanism and eventually make the mechanism bulky for the limited space of the machine head. With the recent development of the electronic techniques, it has become possible that the pattern cams be used only to store the pattern control signals, with the pattern forming devices electrically driven, so as to make the machine mechanism simplified. Especially the development of microcomputer techniques has made it possible to use an electronic memory for electrically driving the pattern forming devices with the increased amount of pattern data stored therein. Now it is generally desired to provide a system which could effectively read out such pattern data from the electronic memory with easy operation and a simple structure suitable for a limited space within and outside of the machine housing. This invention has been provided in response to such a desire.

Now it is a primary object of this invention to provide a pattern selecting system for selecting many patterns with a simple structure, durable and easily operated.

It is another object of this invention to provide a pattern selecting system for a sewing machine which is capable of selecting a plurality of patterns with a single manually operated switch.

It is still another object of this invention to provide a pattern selecting system which is compact and easily installed in a limited space of the sewing machine.

It is still another object of this invention to provide a pattern selecting system including a pattern selection control circuit operated by the single switch.

EXPLANATION OF THE ATTACHED DRAWINGS

FIG. 1 is a front elevational view of a sewing machine embodying the present invention, FIG. 2 is a side view partly in section along the line II—II, FIG. 3 is a control circuit of this invention, FIG. 4 is a partly modified embodiment of the control circuit, and FIG. 5 is still another embodiment of the control circuit.

DESCRIPTION OF THE INVENTION

In reference to FIGS. 1 and 2, reference numeral (1) denotes a machine housing. Numeral (2) is a front panel attached to the machine housing. Numerals (3)–(9) are pattern selection buttons mounted on the front panel. Numeral (10) is an indicating plate on which various patterns (3AC')–(9 D') are printed, though only a few of them are actually represented. Numerals (3AC)–(9D) are indicating lamps mounted on the indicating plate each adjacent to the respective pattern. Numeral (20) denotes one of plural rubber switches each having a conductor (21) and each arranged behind a respective one of the pattern selection buttons (3)–(9). Each rubber switch is operated by way of the respective pattern selection button. Numeral (22) is a printed base plate supported on the panel (2) for establishing connections among circuit components as shown in FIG. 3 including the pattern indicating lamps (3AC)–(9D), the rubber switches (20) and other elements described below, so as to control a memory and other elements connected thereto by means of a connector (23). Numerals (24)–(27) indicate adjustment dials manually operated to electrically adjust zigzag amplitude, feeding amount, upper thread tension, etc., by means of variable resistors or rotary switches. Numerals (28)(29) indicate switches for alternately selecting single needle stitching or twin needle stitching together with the changeover of stitching data, and for selectively setting the feed dog to be ineffective or to be effective by means of on electromagnet or other elements. FIG. 3 depicts a control circuit for a sewing machine including a logic circuit (30). (F/F$_3$)–(F/F$_5$) indicate flip-flop circuits of the master-slave type, and these each have a reset terminal (R) connected to the complement side terminal ($\bar{p}$) of a power-on reset circuit (P.R), and are adapted to be reset when the control power source (Vcc) is thrown. The flip-flop circuits (F/F$_3$)–(F/F$_5$) have their input terminals (J)—(J) each connected to the output terminals of respective NAND circuits (NA$_1$)–(NA$_3$) which encode the states of the pattern selection buttons (3)–(9) as logic values 001–111. These flip-flop circuits have their other input terminals (K) connected to the output terminals of the same NAND circuits in such a manner that the output data of the NAND circuits are inverted. (R)—(R) are ordinary limiting resistors. (MM$_1$), (MM$_2$) are monostable multivibrators. The multivibrator (MM$_1$) has a trigger terminal (T) connected to the output terminal of an OR circuit (OR) whose input terminals are connected to the output terminals of the NAND circuits (NA$_1$)–(NA$_3$). The complement side terminal ($\bar{Q}$) of the monostable multivibrator (MM$_1$) is connected to the trigger terminal (T) of the monostable multivibrator (MM$_2$) whose true side terminal (Q) is connected to the common trigger terminal (C$_p$) of the flip-flop circuits (F/F$_3$)–(F/F$_5$), and the complement side terminal ($\bar{Q}$) of (MM$_2$) is connected to one of the input terminals of a NOR circuit (NOR). The monostable multivibrator (MM$_2$) has a reset terminal (R) connected to the output terminal of the OR circuit (OR).

Each flip-flop circuit (F/F$_3$)–(F/F$_5$) has its input terminal (J)—(J) and its respective output terminal (Q$_3$)–(Q$_5$) connected to the two input terminals of a respective one of three exclusive OR circuits (Ex. OR$_1$)–(Ex. OR$_3$) the output terminals the latter being connected to respective input terminals of the NOR circuit (NOR). The output terminals (Q$_3$)–(Q$_5$) of the flip-flop circuits (F/F$_3$)–(F/F$_5$) are furthermore connected to the input terminals of a decoder (DE$_1$) and also to the terminals (O$_3$)–(O$_5$) of the connector (23) which is connected to a memory and other elements. (F/F$_1$)–(F/F$_2$) are flip-flop circuits constituting a modulo-4 counter and have a reset terminal (R) connected to the complement side output terminal ($\bar{p}$) of the power-on reset circuit (P.R), and are adapted to be reset when the voltage source (Vcc) is switched on. These flip-flop circuits have a trigger terminal ($C_p$) connected to the output terminal of the NOR circuit (NOR), and are operated with each pulse from the NOR circuit to repeatedly advance from 00 to 11 the code at then output terminals ($Q_1$), ($Q_2$). The output terminals ($Q_1$), ($Q_2$) of these two flip-flop circuits are connected to the input terminals of a decoder ($DE_2$) and also connected to the terminals ($O_1$), ($O_2$) of the connector (23). The pattern indicating lamps (3AC)–(9D) are luminous diodes. The luminous diodes (3AC)–(9D) are interconnected to form a row-by-column array, the leftmost column being constituted by the two light-emitting diodes (3AC) and (3BD), the second column being constituted by the four diodes (4A)–(4D), and so forth. The lowermost row is constituted by light-emitting diode (3AC) and by the light-emitting diodes (4A)–(9A), and the uppermost row is constituted by the light-emitting diodes (4D)–(9D), etc. Except for light-emitting diodes (3AC) and (3BD), the anodes of all A-row diodes are connected via a shared resistor R' to the collector of a A-row transistor ($Tr_A$), the anodes of all B-row diodes via another such resistor (R') to the collector a B-row transistor ($Tr_B$), etc. The anode of light-emitting diode (3AC) is connected via respective ones of two simple diodes (D1) and (D3) to the collectors of the transistors ($Tr_A$) and ($Tr_C$), through the intermediate of the associate resistors (R'). Likewise, the anode of light-emitting diode (3BD) is connected via respective ones of two simple diodes (D2) and (D4) to the collectors of the transistors ($Tr_B$) and ($Tr_D$), through the intermediate of the two resistors (R') associated with those two transistors. The cathodes of the two row-3 diodes (3AC), (3BD) are connected in common to the ($N_3$) output of decoder ($DE_1$); the cathodes of all the row-4 diodes (4A)–(4D) are connected in common to the ($N_4$) output of decoder ($DE_1$); and so forth. The emitters of the transistors ($Tr_A$)–($Tr_D$) are connected to the voltage source ($V_{cc}$), and their bases are connected, via respective ones of four resistors (R") to respective ones of the four outputs ($N_A$)–($N_D$) of decoder ($DE_2$). Depression of any single one of the pushbuttons (3)–(9) per se determines which output of decoder ($DE_1$) carries an output signal, and thereby per se determines which column is to have one of its light-emitting diodes illuminated; the number of times such pushbutton is depressed determines which output of decoder ($DE_2$) carries an output signal, and thereby determines which row of light-emitting diodes is to have one of its diodes light up.

FIG. 4 depicts the modified part of a modified version of the embodiment of FIG. 3. In this embodiment, the exclusive OR circuits ($Ex.OR_1$)–(Ex. $OR_3$) have their output terminals connected, via a NOR circuit (NOR), to one input terminal of an AND circuit (AND) and of a NOR circuit ($NOR_2$). The AND circuit has the other input terminal connected to the true side terminal (Q) of the monostable multivibrator ($MM_2$). The AND circuit has its output terminal connected to the trigger terminal ($C_p$) of the flip-flop circuits ($F/F_1$), ($F/F_2$). The NOR circuit ($NOR_2$) has its other input terminal connected to the complement side terminal ($\overline{Q}$) of the monostable multivibrator ($MM_2$). The NOR circuit ($NOR_2$) has its output terminal connected to one input terminal of a NOR circuit ($NOR_3$) whose other input terminal is connected to the true side terminal (P) of the power-on reset circuit (P.R). The NOR circuit ($NOR_3$) has its output terminal connected to the reset terminal (R) of the flip-flop circuits ($F/F_1$), ($F/F_2$).

FIG. 5 depicts a further embodiment of this invention in which a microcomputer system (40) is used in place of the logic circuit (30), the connector (23) and the memory of FIG. 3. The microcomputer system may be a MCS-80 which is a product of the INTEL company. In this case, the voltage source (Vcc) is connected, through a resistor (R'"), to all the pattern selection buttons (3)–(9) on one side thereof which are, in turn, connected to the input terminal (in) of the microcomputer system (40). These pattern selection buttons are, on the other side thereof, connected to respective ones of the pattern indicating lamps (3AC)–(9D), and are also connected to respective output terminals ($OUT_1$) of the microcomputer system (40). The transistors (TrA)–(TrD) are all connected, through the resistors (R")—(R"), to respective output terminals ($OUT_2$) of the microcomputer system (40). In FIG. 3, when the voltage source (Vcc) is switched on, the outputs ($Q_1$)–($Q_5$) of flip-flop circuits ($F/F_1$)–($F/F_5$) all become 0. If the pattern selection button (3) is firstly pushed, the outputs of the NAND circuits ($NA_3$), ($NA_2$), ($NA_1$) become 0,0,1 and these output values are compared with the outputs ($Q_5$), ($Q_4$), ($Q_3$) of the flip-flop circuits ($F/F_5$)–($F/F_3$), and then the output values of the exclusive OR circuits ($EX.OR_3$), ($EX.OR_2$), ($EX.OR_1$) become 0,0,1. On the other hand, the complement side output ($\overline{Q}$) of the monostable multivibrator ($MM_1$) generates a negative pulse having a rising trailing flank. Subsequently the complement side output ($\overline{Q}$) of the monostable multivibrator ($MM_2$) generates a negative pulse. However, since the other three inputs of the NOR circuit (NOR) are all in receipt of the value 1, the NOR circuit (NOR) will not generate a pulse. Therefore, the outputs ($Q_2$), ($Q_1$) of the flip-flop circuits ($F/F_2$), ($F/F_1$) maintain the values 0,0. This is because the outputs ($Q_5$), ($Q_4$), ($Q_3$) of flip-flop circuits ($F/F_5$), ($F/F_4$), ($F/F_3$) are rendered 0,0,1, thereby making the three inputs of the NOR circuit (NOR) all 0, at the time of the trailing flank of the negative pulse produced at the complement side output ($\overline{Q}$) of the monostable multivibrator ($MM_2$), namely at the end of the pulse produced at the true side output (Q) of the monostable multivibrator ($MM_2$), but at that time the output ($\overline{Q}$) is 1 and there is no pulse to be applied to the trigger terminal (Cp) of the flip-flop circuits ($F/F_2$), ($F/F_1$). The data 0 0 1 will cause the first output ($N_3$) of the decoder ($DE_1$) to be 0, and the other outputs to be 1. The data 0 0 at the outputs ($Q_2$), ($Q_1$) of the flip-flop circuits ($F/F_2$), ($F/F_1$) will cause the first output ($N_A$) of the decoder ($DE_2$) to be 0, and the other outputs to be 1. Thus the pattern indicating lamp (3AC) is lit, and the output code ($O_5$)–($O_1$) becomes 0 0 1 0 0 for producing straight stitches (3AC').

In order to select another pattern, for example, pattern (5B'), the pattern selection button (5) is once pushed. Then the outputs of the NAND circuits ($NA_3$), ($NA_2$), ($NA_1$) become 0, 1, 1 respectively, and the flip-flops ($F/F_2$), ($F/F_1$) do not count up as in the case when the button (3) was pushed. In this case, the pattern indicating lamp (5A) is lit and the output code ($O_5$)–($O_1$) becomes 0 1 1 0 0. For selecting pattern (5B'), the button (5) must be pushed again. In this case, the input data of the flip-flop circuits ($F/F_5$)–($F/F_3$) become 0, 1, 1, respectively and the three inputs of the NOR circuits (NOR) become 0, 0, 0, and then the negative pulse from the complement side terminal ($\overline{Q}$) of the monostable multivibrator (MM$_2$) advances the output data of the flip-flop circuits (F/F$_1$) by 1 to make the data 01. Namely the second output (N$_2$) of the decoder (DE$_2$) is rendered 0 while the third output (N$_5$) of the decoder (DE$_1$) becomes 0 and the other outputs become 1 all in response to the aforementioned input data 0 1 1 of the flip-flop circuit (F/F$_5$)-(F/F$_3$). As the result, the pattern indicating lamp (5B) is lit and the output code (O$_5$)-(O$_1$) becomes 0 1 1 0 1, and thus pattern (5B') is stitched. In this manner, each subsequent pushing of the button (5) causes the lamps (5C), (5D), (5A), to light up in order. Therefore, the machine operator can select any of the patterns by repeatedly pushing the pattern selection button of the pattern group involved.

In case the pattern selection buttons (3)-(9) are not firmly pushed, for example, resulting in chattering, the reset terminal (R) of the monostable multivibrator (MM$_2$) becomes effective to prevent the flip-flop circuits (F/F$_2$), (F/F$_1$) from counting, thereby to prevent the erroneous operation of the pattern selection system. The control circuit in FIG. 3 is as shown so formed as to select, after the selection of the pattern (5B'), the pattern (6B') if the pattern selection button (6) is pushed, and to select, after the selection of the pattern (6B'), the pattern (7B') if the button (7) is pushed. Thus the changeover of the pattern selection buttons (3)-(9) initially selects one of the transversely aligned patterns as shown in FIG. 1.

In contrast to the control circuit in FIG. 3, the partly modified circuit as shown in FIG. 4 is so formed as to select, for example after the selection of the pattern (5B'), the pattern (6A') if the pattern selection button (6) is pushed. Namely the changeover of the selection buttons (3)-(9) initially selects the first one of the pattern groop under the control of the button. In this embodiment, each time a different one of the selection buttons (3)-(9) is pushed, one of the inputs of the NOR circuit (NOR$_2$) or the output of the NOR circuit (NOR$_1$) becomes 0, and the other input of the NOR CIRCUIT (NOR$_2$), with reception of the rising pulse from the complement side output ($\overline{Q}$) of the monostable multivibrator (MM$_1$), resets the flip-flip circuits (F/F$_2$), (F/F$_1$) via the NOR circuit (NOR$_3$). Therefore the outputs (O$_2$), (O$_1$) of the outputs (O$_5$)-(O$_1$) are rendered 0 0 and the pattern (6A') is selected.

FIG. 5 depicts another embodiment of this invention including a microcomputer (40) which is specifically programmed for a sewing machine and has seven output terminals (OUT$_1$) in such of which one is at any time grounded and the others not grounded, and the ground level is shifted with a constant increment within the terminal group. Now if one of the pattern selection buttons (3)-(9) is pushed, the input (in) of the microcomputer (40) encodes the operation of the button and compares the code with the previous code to cause a predetermined one of the four output terminals (OUT$_2$) to be grounded in the same manner as with the control circuit of FIG. 3 in which the transistors are operated in dependence upon the count of the flip-flop circuits (F/F$_2$), (F/F$_1$). The ground level will operate a predetermined one of the transistors in a timed relation with the selection button influencing the aforementioned shifted line. This is performed by the programmed operation of the microcomputer (40) so as to realize the pattern selection as well as the pattern indication just as realized in the control circuit in FIG. 3.

We claim:

1. In a sewing machine having a machine housing, a memory storing data for a plurality of selectable stitch patterns and pattern forming devices actuated by the stitch-pattern data, a novel user-operated pattern-selection system comprising, in combination, a plurality of similarly organized groups of pattern indicator elements located on the exterior of the machine housing, each pattern indicator element having an indicating and a non-indicating state, a plurality of user-activated selector switches, one for each of said similarly organized groups of pattern indicator elements, and control circuit means connected to the useractivated selector switches and connected to the pattern indicator elements, the control circuit means being operative, when the user activates a selector switch not associated with the group containing the presently indicating indicator element, for causing the presently indicating indicator element to convert to non-indicating state and furthermore causing a predetermined one of the indicator elements in the group associated with the newly activated selector switch to assume indicating state.

2. In a sewing machine as defined in claim 1, the control means comprising means operative, when the user activates a selector switch not associated with the group containing the presently indicating indicator element, for causing the presently indicating indicator element to convert to non-indicating state and furthermore causing that one of the indicator elements in the group associated with the newly activated selector switch corresponding in its location within such group to the just previously indicating indicator element to now assume indicating state, whereby when the user activates the new selector switch the just previous indication state transfers itself from the indicator element of one group to the correspondingly located indicator element within the newly selected group.

3. In a sewing machine as defined in claim 1, the control means comprising means operative, when the user activates a selector switch not associated with the group containing the presently indicating indicator element, for causing the presently indicating indicator element to convert to non-indicating state and furthermore always causing the first indicator element of the newly selected group to convert to indicating state irrespective of whether the just previously indicating indicator element was or was not the first indicator element within its group.

4. In a sewing machine as defined in claim 2, the control means responding to initial activation of a selector switch not associated with the group containing the presently indicating indicator element by performing the operation set forth in claim 2, and responding to continued activation of the newly selected selector switch by causing successive ones of the indicator elements in the newly selected group to convert to indicating state.

5. In a sewing machine as defined in claim 3, the control means responding to initial activation of a selector switch not associated with the group containing the presently indicating indicator element by performing the operation set forth in claim 3, and responding to continued activation of the newly selected selector switch by causing successive ones of the indicator elements in the newly selected group to convert to indicating state.

6. In a sewing machine as defined in claim 2, the indicator elements being arranged on the exterior of the machine housing as a row-by-column array the columns of which constitute the respective ones of the plurality of groups, the control means responding to activation of a selector switch not associated with the column containing the presently indicating indicator element by causing the presently indicating indicator element to convert to nonindicating state and furthermore causing that indicator element in the newly selected column which is in the same row as the just previously indicating indicator element to assume indicating state.

7. In a sewing machine as defined in claim 3, the indicator elements being arranged on the exterior of the machine housing as a row-by-column array the columns of which constitute the respective ones of the plurality of groups, the control means responding to activation of a selector switch not associated with the column containing the presently indicating indicator element by causing the presently indicating indicator element to convert to nonindicating state and furthermore causing the first indicator element in the newly selected column to assume indicating state irrespective of whether the just previously indicating indicator element was or was not the first indicator element within its column.

8. In a sewing machine as defined in claim 6, the control means responding to initial activation of a selector switch not associated with the column containing the presently indicating element by performing the operation set forth in claim 6, and responding to continued activation of the newly selected selector switch by causing successive ones of the indicator elements in the newly selected column to convert to indicating state.

9. In a sewing machine as defined in claim 7, the control means responding to initial activation of a selector switch not associated with the column containing the presently indicating indicator element by performing the operation set forth in claim 7, and responding to continued activation of the newly selected selector switch by causing successive ones of the indicator elements in the newly selected column to convert to indicating state.

10. In a sewing machine as defined in claim 6, the rows extending horizontally on the exterior of the machine housing, the columns extending vertically on the exterior of the machine housing.

* * * * *